United States Patent Office 2,738,301
Patented Mar. 13, 1956

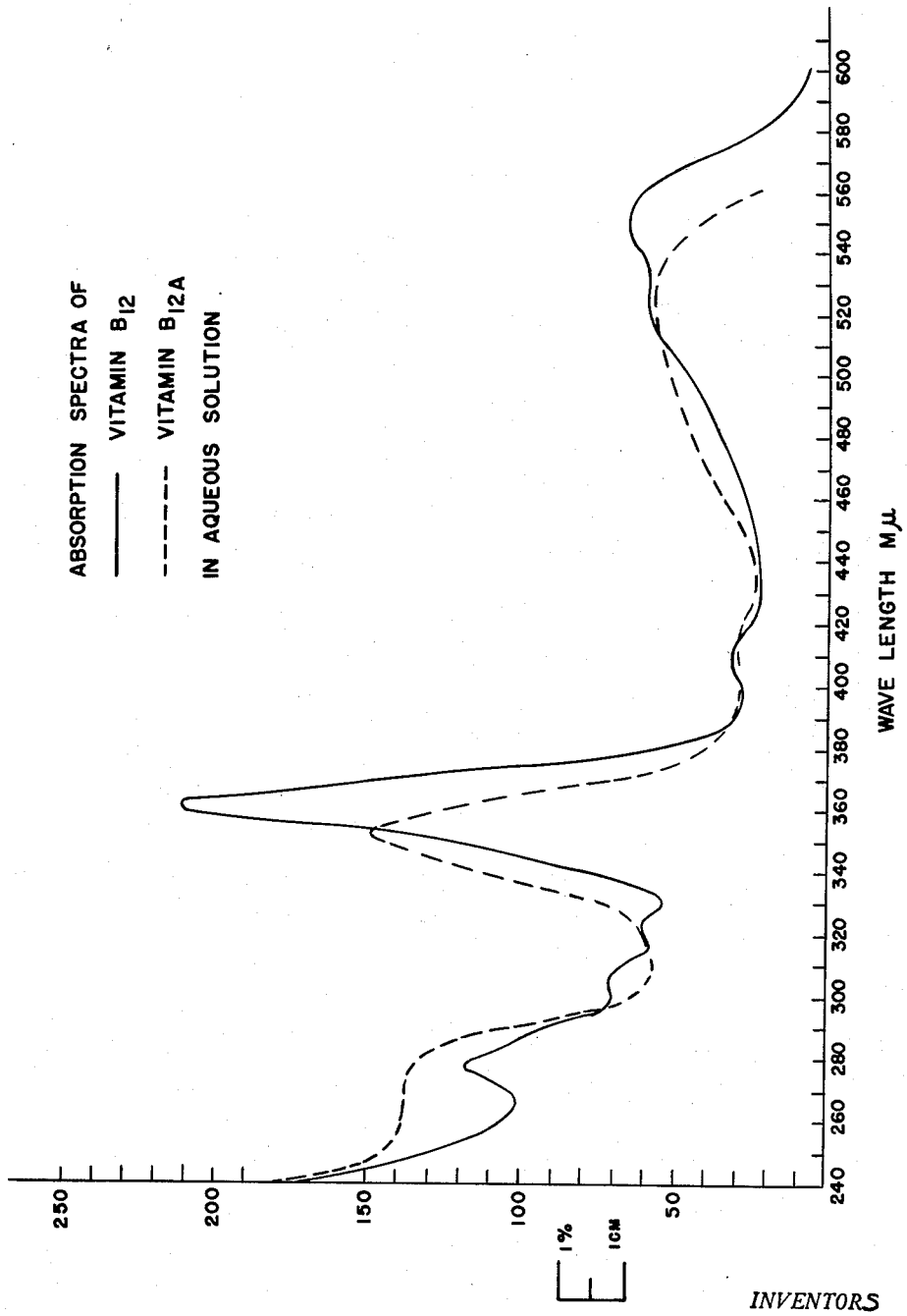

2,738,301

HYDROXY ANALOG OF VITAMIN $B_{12}$ AND PROCESSES FOR PREPARING THE SAME

Edward A. Kaczka, Elizabeth, Donald E. Wolf, Princeton, and Karl Folkers, Plainfield, N. J., assignors to Merck & Co., Inc., Rahway, N. J., a corporation of New Jersey Application July 20, 1950, Serial No. 175,000

8 Claims. (Cl. 167—81)

This application is a continuation-in-part of our pending application Serial No. 108,426, filed August 3, 1949, which is a division of application Serial No. 77,056, filed February 17, 1949, both now abandoned.

This invention relates to the preparation of a therapeutically valuable substance, and more particularly to a chemically modified form of vitamin $B_{12}$. For convenience, our novel chemical substance has been designated vitamin $B_{12a}$.

Vitamin $B_{12}$ has been described by Rickes et al., in Science 107, 396–397 (1948). In view of the outstanding importance of vitamin $B_{12}$ in the treatment of pernicious anemia, great interest has been centered in studying the constitution of this most potent compound in an effort to prepare it by complete synthesis, and to propare modications thereof which might extend the usefulness of vitamin $B_{12}$.

Unfortunately, in contrast to the other known vitamins, vitamin $B_{12}$ is found to be an exceedingly complex compound having molecular weight in excess of 1300. Consequently, thus far it has not been possible to determine the complete composition of vitamin $B_{12}$, although some information of significant importance has resulted from studies of the constitution of this vitamin. It has been found that the compound contains cobalt, and further that it contains a CN group which under certain conditions can be replaced by other radicals. From these, and other studies, it is believed that vitamin $B_{12}$ is a cobalt complex of the type known as Werner coordination compounds, containing certain other coordinated groups in addition to the cyanide group mentioned previously. The structure of this compound may be represented as follows:

wherein the cobalt atom has coordinated to it five groups represented by

two of these groups being negative in character indicated by — — and the other three, represented by 000 being neutral in character; the sixth group coordinated to the cobalt being the CN⁻ group. The atoms comprising the five groups represented by

coordinated to the cobalt are also probably linked to each other in some form as yet unknown.

Vitamin $B_{12a}$, the compound of our invention, may be considered to be the hydroxy analog of vitamin $B_{12}$ wherein a hydroxy group has replaced the cyanide group in the vitamin $B_{12}$ molecule. Apparently, vitamin $B_{12a}$ exists in aqueous solutions as a equilibrium mixture of the hydroxy isomer and the ionic aquo isomer as shown in the following equation:

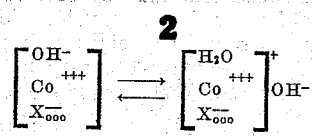

It should, of course, be understood that these theoretical explanations for the possible structure of vitamins $B_{12}$ and $B_{12a}$, are based on our present knowledge of these products and does not exclude the possibility that subsequent experimental data will be establish that the postulated structures are, in fact, incorrect. Accordingly, we do not wish to be bound by these theoretical considerations however likely they may appear to be in the light of our present knowledge. These explanations are presented principally as a means for providing a better understanding of our invention.

Vitamin $B_{12a}$ has important advantages over vitamin $B_{12}$. First, it is more readily obtained in some instances in pure form than is vitamin $B_{12}$. For example, vitamin $B_{12a}$ may be recovered relatively easily in pure form by crystallization from certain solvent mixtures; whereas it is sometimes difficult to obtain vitamin $B_{12}$ in pure crystalline form from concentrates.

In preparing our novel chemical compound, we may utilize as the starting material, vitamin $B_{12}$, which in its pure form is a red colored crystalline solid having refractive indices $\alpha$, 1.619; $\beta$, 1.649; $\gamma$, 1.659 after drying at 100° C. in vacuo until the indices are constant, and exhibiting strong absorption bands at 2780 A., 3610 A. and 5500 A. Vitamin $B_{12}$ is described in more detail by Edward L. Rickes et al. in Science, volume 107, pages 396 and 397 (1948). Crystalline vitamin $B_{12}$ is found to have an activity of about 11,000,000 units/mg. as determined by the 23-hour LLD factor assay of Shorb, J. Biol. Chem., 1946, 163, 393. Various methods suitable for preparing vitamin $B_{12}$ are described in United States patent application Serial No. 20,356, filed April 10, 1948, now abandoned.

Alternatively, we have found that vitamin $B_{12a}$ can be isolated from concentrates of vitamin $B_{12}$ obtained from fermentation sources. These crude concentrates of vitamin $B_{12}$ contain substantial amounts of vitamin $B_{12a}$ which can be isolated by suitable process such as fractional crystallization from solvents.

In accordance with one embodiment of our invention vitamin $B_{12}$ or concentrates thereof are reacted with hydrogen and a catalyst and vitamin $B_{12a}$ is recovered.

A crude vitamin $B_{12}$ concentrate or a purified form of vitamin $B_{12}$ is dissolved in water, an alcohol or aqueous mixture thereof. The solution containing vitamin $B_{12}$ thus formed is reacted with hydrogen in the presence of a hydrogenation catalyst such as Raney nickel, the noble metals or the noble metal oxides. The reaction is conveniently carried out at approximately room temperature and at substantially atmospheric pressure. After about three mols of hydrogen per mol of vitamin $B_{12}$ has been absorbed, the rate of hydrogen consumption decreases appreciably, and the removal of the cyanide radical from vitamin $B_{12}$ is substantially complete. During the reduction, the color of the reaction mixture changes from the characteristic red color of vitamin $B_{12}$ to a brown color. It is preferable to stop the reaction after the required three mols of hydrogen have been absorbed, since further reduction may result in more extensive changes.

When the reduction is complete, the suspended catalyst is removed from the solution which on reoxidation by exposure to air changes in color from brown to red. By evaporating the resulting red solution, vitamin $B_{12a}$ is obtained in solid form. The vitamin $B_{12a}$ is prepared in crystalline form by dissolving the residue so obtained in a small amount of water, and adding acetone to the resulting aqueous solution. Upon allowing the aqueous-acetone solution to stand at room temperature, the vitamin $B_{12a}$ crystallizes and may be separated from the mother liquors by filtration or centrifugation. Alternatively the aqueous solution obtained after removing the suspended hydrogenation catalyst may be diluted with about 7 or 8 volumes of acetone, and the resulting aqueous-acetone solution allowed to stand until crystallization of the vitamin $B_{12a}$ is complete.

In accordance with a further embodiment of our invention, we find that vitamin $B_{12a}$ can be recovered from fermentation broths produced by the propagation of various microorganisms such as certain strains of S. griseus, S. aureofaciens, and the like. For example, when a streptomycin or grisein-producing strain of S. griseus is propagated in a medium which contains a source of cobalt and is suitable for the production of streptomycin or grisein, a concentrate can be recovered from the resulting broth containing vitamin $B_{12}$, vitamin $B_{12a}$, and associated impurities. Such a concentrate is obtained for example, by treating a broth with activated charcoal to effect adsorption of the active substances, eluting the charcoal with aqueous pyridine, concentrating the eluate to dryness, dissolving the residue in alcohol, chromatographing on activated alumina, and crystallizing the active fractions from water. The vitamin $B_{12}$ in such a concentrate can be separated from the vitamin $B_{12a}$ by extracting an aqueous solution of the concentrate with portions of benzyl alcohol until no more vitamin $B_{12}$ is removed. It is possible to remove vitamin $B_{12}$ by this method since vitamin $B_{12}$ has a water/benzyl alcohol distribution coefficient of about 1.2 while the distribution coefficient of vitamin $B_{12a}$ in these solvents is about 8. After separating the benzyl alcohol layer from the water layer, the vitamin $B_{12a}$ can be recovered by concentrating the water mixture and recrystallizing the residue from water by the addition of acetone. Alternatively, other methods such as fractional crystallization of the crude concentrate from a water-acetone mixture can be utilized to recover vitamin $B_{12a}$ in crystalline form directly. The vitamin $B_{12a}$ can be readily identified by means of its ultraviolet absorption spectrum as is more completely described hereinafter.

An aqueous solution of crystalline vitamin $B_{12a}$ prepared by any of the previous methods exhibits the following principal absorption maxima:

|  | in A. | $E_{1\ cm.}^{1\%}$ |
| --- | --- | --- |
| Shoulder or Broad Band | 2,700 to 2,770 | 137 |
| Strong Band | 3,520 to 3,540 | 150 |
| Band | 5,200 to 5,300 | 58 |

In addition there is a faint band at 4150 A. with $$E_{1\ cm.}^{1\%}\ 29$$

The absorption spectrum of vitamin $B_{12a}$ varies slightly with change in pH of the solution. With a decrease in pH the intensity of the principal bands is greater and the maxima are better defined. At pH 7 or higher the intensity of the principal bands decreases and the position of the maxima shifts to slightly higher wavelengths.

The accompanying drawing shows the ultraviolet absorption spectrum of vitamin $B_{12a}$ and that of vitamin $B_{12}$. The term $$E_{1\ cm.}^{1\%}$$

is the optical density of a 1% solution of the substance in a cell 1 cm. in length as determined at the particular light wave length. While the curves are somewhat similar in general appearance, it will be seen that absorption maxima of the two substances are distinctly different. Accordingly the ultraviolet spectrum in conjunction with the other properties serve to distinguish vitamin $B_{12a}$ from vitamin $B_{12}$.

Vitamin $B_{12a}$ is a compound having the properties of a weak base which can be titrated with acid. Since it readily forms salts, it is important in the process of preparing vitamin $B_{12a}$ that it be kept free from acids, acid-forming substances, or anions other than hydroxyl. In its chemical reactions, vitamin $B_{12a}$ can be considered to be the hydroxy analog of vitamin $B_{12}$, i. e., it may be thought of as a compound wherein a hydroxy group has replaced the cyanide group of vitamin $B_{12}$.

Vitamin $B_{12a}$ has been found to be capable of promoting the growth of the microorganisms, Lactobacillus lactis Dorner and L. leichmannii, and therefore these organisms may be used as a means of assaying this product. In the following table are shown typical assay results of samples of vitamin $B_{12a}$ obtained by hydrogenating vitamin $B_{12}$, and from S. griseus, in comparison with vitamin $B_{12}$.

Table I.—Microbiological data

|  | L. lactis | |
| --- | --- | --- |
|  | (titrimetric) units/μg. | (cup) units/μg. |
| 1. Vitamin $B_{12a}$ (by hydrogenation) | 7,700 | 11,000 |
| 2. Vitamin $B_{12a}$ (from S. griseus) | 6,600 | 10,800 |
| 3. Vitamin $B_{12}$ | 11,000 | 11,000 |

|  | L. leichmannii | |
| --- | --- | --- |
|  | Aseptic addition of sample, u./μg. | Sample autoclaved with medium, u./μg. |
| 1. Vitamin $B_{12a}$ (by hydrogenation) | 9,500 | 2,100 |
| 2. Vitamin $B_{12a}$ (from S. griseus) | (not determined) | 2,350 |
| 3. Vitamin $B_{12}$ | 11,000 | 11,000 |

It will be noted from the foregoing data that the microbiological assays of a sample of vitamin $B_{12a}$ prepared by hydrogenating vitamin $B_{12}$ and a sample of the same product obtained from S. griseus are about the same. Further, it will be seen that although by the titrimetric method of assay with L. lactis vitamin $B_{12a}$ appears to be only one half as active as vitamin $B_{12}$, by the cup assay with this same microorganism it is fully as active as vitamin $B_{12}$. In the L. leichmannii assay, vitamin $B_{12}$ and vitamin $B_{12a}$ are equally active if added aseptically to sterile culture medium. However, if autoclaved with the medium vitamin $B_{12a}$ is inactivated and shows only 17% as much activity as vitamin $B_{12}$. The cup assay procedure is described in Science 110, 507 (1949), the L. lactis tube (titrimetric) procedure in J. Biol. Chem. 180, 125 (1949), and the L. leichmannii tube procedure in J. Biol. Chem. 175, 475 (1948).

The red crystals of vitamin $B_{12a}$ are needle-like or blades whose crystal system is orthorhombic. The indices of refraction for the crystalline product dried at room temperature in vacuo are about $\alpha$, 1.580; $\beta$, 1.640; and $\gamma$, 1.656. Heating the product in vacuum at 100° C. does not alter the $\beta$ and $\gamma$ indices but causes a progressive increase in the $\alpha$ index. Thus, on heating a sample of vitamin $B_{12a}$ at 100° C. for two hours in vacuo, the refractive indices were found to be about $\alpha$, 1.604; $\beta$, 1.640; and $\gamma$, 1.654.

Vitamin $B_{12a}$ is relatively soluble in water, lower aliphatic alcohols and aqueous alcohol mixtures. It is relatively insoluble in solvents such as ether, acetone, chloroform, carbon tetrachloride, benzene, toluene, petroleum ether, and the like. Vitamin $B_{12a}$ is soluble to the extent of about 3.6 mg. per ml. in a mixture containing 80% acetone and 20% water (by volume) and to the extent of about 0.71 mg./ml. in a mixture consisting of 85% acetone and 15% water by volume.

As is more fully disclosed in our pending application Serial No. 174,999, filed July 20, 1950, vitamin $B_{12a}$ may be readily converted to other analogs of vitamin $B_{12}$ by reacting it with an acid such as hydrochloric acid, sulfuric acid, thiocyanic acid, and hydriodic acid to produce respectively the chloride, sulfate, thiocyanate and iodide analogs of vitamin $B_{12}$. Further, by treating vitamin $B_{12a}$ with a solution containing cyanide ions the vitamin $B_{12a}$ is converted to vitamin $B_{12}$. Analogs may also be prepared by reacting vitamin $B_{12a}$ with a salt of the anion corresponding to the analog desired. For example, by reacting vitamin $B_{12a}$ with an alkali metal nitrite, thiocyanate, or iodide it is converted to the nitrite, thiocyanate or iodide analog respectively.

The following are approximate analyses of two samples of vitamin $B_{12a}$ obtained in accordance with the previously described processes:

Nitrogen _____ 13.75   13.33
Phosphorus _____ 2.18   (not determined)
Cobalt _____ 4.64   (not determined)
Carbon, hydrogen, and oxygen are also present.

Vitamin $B_{12a}$ gradually darkens with charring and decomposition and without melting on heating. Depending upon the rate of heating, it darkens at about 200° C., and does not melt on heating to 300° C.

During the reduction of vitamin $B_{12}$ to vitamin $B_{12a}$ the color of the solution changes from the characteristic red color of vitamin $B_{12}$ to a brown color. This brown solution on exposure to air turns to a deep red color characteristic of vitamin $B_{12a}$. This red color is different than that of solutions of vitamin $B_{12}$.

For comparison and summary, the criteria which serve to differentiate vitamin $B_{12}$ and vitamin $B_{12a}$ are listed in Table II.

Table III.—Activity of vitamin $B_{12a}$ in rats

| Substance | Dose Fed Daily, μg. | No. of Male Rats | Wt. Increment, g., 15 days |
|---|---|---|---|
| Control (undosed) | | 10 | 27 |
| Vitamin $B_{12}$ | 0.063 | 10 | 56 |
| Vitamin $B_{12}$ | 0.125 | 10 | 61 |
| Vitamin $B_{12a}$ | 0.063 | 10 | 60 |
| Vitamin $B_{12a}$ | 0.125 | 10 | 59 |

Vitamin $B_{12a}$ has also been tested clinically and has been found to be effective in promoting clinical improvement and in producing positive hemopoietic responses in patients with Addison's pernicious anemia, tropical sprue, non-tropical sprue, and nutritional macrocytic anemia. Because of extreme variability from patient to patient, comparative studies on the effect per unit of weight of vitamin $B_{12}$ and $B_{12a}$ will take some time to evaluate. However, it had been established that vitamin $B_{12a}$, like vitamin $B_{12}$, produces a rise in reticulocytes, red blood cells, white blood cells, platelets and hemoglobin, and promotes a return of the bone marrow to normal.

The preparation of our novel compound, vitamin $B_{12a}$, possessing pronounced therapeutic value in the treatment of pernicious anemia, and possessing properties which make possible the convenient recovery of the compound in pure form, may be illustrated by the following specific examples.

Example 1

A solution containing 26.3 mg. of vitamin $B_{12}$ in 15 ml. of water was shaken with 78 mg. of platinum oxide catalyst and hydrogen gas under substantially atmospheric pressure at 25° C. for 20 hours. Hydrogen was absorbed. During the absorption of hydrogen the color of the solution changed from red to brown. The solution was separated from the catalyst and evaporated to dryness in vacuo. The residue was then dissolved in 1 ml. of water and then diluted with about 6 ml. of acetone. After stand-

Table II

| Property | Vitamin $B_{12}$ | Vitamin $B_{12a}$ |
|---|---|---|
| Refractive Indices | $\alpha$1.619 (after drying at 100° C. in vacuo)<br>$\beta$1.649<br>$\gamma$1.659 | $\alpha$1.580 (after drying at room temperature in vacuo).<br>$\beta$1.640.<br>$\gamma$1.656. |
| Absorption spectra in water | Wave Length, A. / $E^{1\,cm}_{1\%}$<br>Definite maximum — 2780 / 114.7<br>Strong maximum — 3610 / 203.5<br>Maximum — 5500 / 62.7 | Shoulder or broad band 2,700–2,770A., 137.<br>Strong maximum 3,520–3,540A., 150.<br>Maximum 5,200–5,300A., 58. |
| Polarigraphic data [1] | One wave with $E\frac{1}{2}$=−1.00 v. and $Id/c$=−2.3 microamps./mg./cc. | Five waves of which only first is resolved.<br>1. $Id/c$=0.34 microamps./mg./cc. and $E\frac{1}{2}$=−0.12 v.<br>2–5. combined give $E$=−0.2 to −1.2 v. and $Id/c$=2.73. |
| Activity for growth of LLD | 11,000 units/microgram | 6,600–7,700 units/microgram (titrimetric).<br>11,000 units/microgram (cup assay). |
| Distribution coefficient for benzyl alcohol-water [2] | about 1.2 | about 8.0. |
| Melting point | Darkens 210–220° C.<br>Does not melt up to 300° C. | Darkens at about 200° C.<br>Does not melt up to 360° C. |

[1] All run in 0.1 N lithium borate buffer, pH 9, at 25° and with $M^{2/3}\,T^{1/6}$=2.16 mg.$^{2/3}$ sec.$^{-1/2}$.
[2] Concentration in water; concentration in solvent.

Vitamin $B_{12}$ has shown "animal protein factor" activity when fed to rats on a diet devoid of animal protein and containing 0.25% of thyroid powder (Proc. Soc. Exp. Biol. and Med., 7B, 392 (1949)). Vitamin $B_{12a}$ was first assayed at a level of 0.125 μg. in this test, and as seen in Table III, the response was equivalent to that elicited by 0.063 μg. of vitamin $B_{12}$; when one-half the dose of vitamin $B_{12a}$ was fed, the gain in weight was also comparable to that elicited by an equal weight of vitamin $B_{12}$.

ing for several hours a small amount of precipitate (about 2–3 mg.) was formed and was then separated from the solution. This solution was diluted with an additional 2 ml. of acetone and again allowed to stand for several hours. During this time about 4–5 mg. of noncrystalline precipitate formed. This solid was separated from the solution and an additional 2 ml. of acetone was added to the solution. On standing vitamin $B_{12a}$ began to crystallize in the form of red needles. After standing for 24 hours, the crystalline material was separated, yield 12 mg. By further dilution of the mother liquor with acetone additional crystalline precipitate formed.

The red needles of vitamin $B_{12a}$ showed refractive indices of $\alpha=1.580\pm0.002$; $\beta=1.640\pm0.002$; $\gamma=1.656\pm0.002$, after drying at room temperature in vacuo. Crystal habit is needle-like or blades; crystal system is orthorhombic.

An aqueous solution of the red needles of vitamin $B_{12a}$ exhibited the following absorption spectrum:

| | $\lambda$ in A. | $E_{1\%}^{1\text{ cm.}}$ |
|---|---|---|
| Shoulder or Broad Band | 2,750 | 128 |
| Strong Band | 3,525 | 154 |
| Band | 5,300 | 56 |

Example 2

A solution of 16.5 mg. of vitamin $B_{12}$ in 12 ml. of water was shaken with 48 mg. of palladium oxide catalyst and hydrogen gas under substantially atmospheric pressure at 25° C. for 30 hours. On absorption of hydrogen the solution turned from red to brown in color. After no further hydrogen was absorbed the solution was filtered and evaporated to dryness in vacuo. The microbiological assay showed the residual material to have an LLD activity value of 3000 to 5000 units per microgram.

Example 3

Nineteen and two-tenths mg. of a crude concentrate of vitamin $B_{12}$ was treated in water solution with hydrogen and a palladium catalyst at 25° C. After absorption of hydrogen was complete, the catalyst was removed leaving a yellow-colored solution. Microbiological assay of the residue showed the material to have an LLD activity of 96 units per microgram. This low LLD value is attributed to the fact that a crude starting material containing impurities was used.

Example 4

Twenty-six mg. of vitamin $B_{12}$ was dissolved in 14 ml. of water and then shaken with about 100 mg. of Raney nickel catalyst under a slight hydrogen pressure for two hours at 25–26° C. The dark-colored solution was separated from the catalyst by centrifugation and then concentrated to a volume of 6–8 ml. in vacuo to about 28° C. The concentrated solution was diluted with about 5 volumes of acetone and then allowed to stand at 26–28° C. After standing for several hours dark red needle-like crystals of vitamin $B_{12a}$ separated from solution. The first crop of crystals weighed 5.2 mg. and the absorption spectrum of an aqueous solution showed maxima at 2750 A., 3525 A., and 5300 A.

After recrystallization the crystals exhibited the typical absorption spectrum of vitamin $B_{12a}$ shown on page 6.

Example 5.—Vitamin $B_{12a}$

Twenty-eight and three-tenths milligrams of vitamin $B_{12}$ was dissolved in 14 ml. of water containing 93 mg. of previously reduced platinum oxide catalyst. This solution was stirred under a slight hydrogen pressure for seventeen and one-quarter hours. During the absorption of hydrogen the color of the solution changed from red to brown. On subsequent exposure to air, the resulting solution slowly turned red. The catalyst was separated from the solution by centrifuging and then the solution was concentrated to a volume of 7–8 ml. This solution was diluted with about 7–8 volumes of acetone and crystallization began after standing at room temperature for a short time. Yield of vitamin $B_{12a}$, 16 mg.

The above experiment was repeated using 107.3 mg. of vitamin $B_{12}$. The yield of vitamin $B_{12a}$ after one recrystallization from acetone-water was 59 mg. The refractive indices of these crystals of vitamin $B_{12a}$ were $\alpha$, 1.580; $\beta$, 1.640; $\gamma$, 1.656 after drying at room temperature in vacuo, and $\alpha$, 1.604; $\beta$, 1.640; $\gamma$, 1.654 after drying at 100° C. in vacuo.

The crystalline vitamin $B_{12a}$ from the above experiments was combined and recrystallized from water by the addition of acetone. Yield 56 mg. These crystals were shown to be at least 98% pure by solubility analysis.

The absorption spectrum in aqueous solution at natural pH showed principal maxima at about 5300 A. ($E_{1\text{cm.}}^{1\%}$ 56);

3525 A. ($E_{1\text{cm.}}^{1\%}$ 150), a faint band at about

4150 A. ($E_{1\text{cm.}}^{1\%}$ 29)

and a broad band at

2700–2770 A. ($E_{1\text{cm.}}^{1\%}$ 137)

*Analysis.*—Found: N, 13.75; P, 2.18; Co, 4.64.

Example 6

A streptomycin broth prepared by cultivating a streptomycin producing strain of *S. griseus* in a liquid nutrient medium containing soybean meal was worked up in the usual way to remove the mycelium and suspended solids. The filtered broth was then passed through a column containing a carboxylic acid resin, a granular copolymer of methacrylic acid and divinyl benzene containing 5% divinyl benzene, which removed the streptomycin.

The resulting spent broth was treated with activated charcoal to absorb the substances capable of promoting the growth of *Lactobacillus lactis* Dorner. The active substances were then eluted from the charcoal with an aqueous-pyridine or aqueous-picoline solution and concentrated to remove the pyridine or picoline. Methanol was added to the resulting solution causing the precipitation of impurities which were removed by filtration. Acetone was then added to the filtrate resulting in the precipitation of the active substances which were separated from the solution and extracted with methanol. The active substances were precipitated from the methanol by the addition of acetone, separated, and extracted again with methanol. This purification procedure was repeated several times, and then the active substances were precipitated from the methanol solution by adding ethyl ether. This precipitate was dissolved in methanol and chromatographed over activated alumina. The column was then developed with methanol to obtain a main red-colored band which was finally eluted with methanol. Ether was then added to the rich methanol eluate precipitating the active material which was separated and extracted with methanol. This chromatographic purification procedure was repeated twice more, and the active substances finally precipitated from the rich eluate with ether. The product so obtained was separated and dissolved in water. Upon the addition of acetone to this aqueous solution a crystalline product containing the active substances precipitated and was recovered.

Fifteen and seven-tenths milligrams of this red crystalline mixture which was shown to contain about 25% of vitamin $B_{12}$, was dissolved in 3 ml. of water and extracted seven times with 2 to 3 ml. portions of benzyl alcohol. The aqueous solution was then extracted several times with ether to remove dissolved benzyl alcohol and then traces of ether removed in vacuo. The aqueous solution was then diluted with about 5–7 volumes of acetone and after standing for a short time, crystallization began. The dark-red needles that formed were separated from the solution, washed with acetone and dried. Yield, 6 mg. of vitamin $B_{12a}$. The absorption spectrum in aqueous solution at the natural pH showed principal maxima at about 2740–2750 A., 3530–3540 A. and 5200–5300 A. characteristic of vitamin $B_{12a}$.

Example 7

One-hundred and forty-eight milligrams of crude crystalline product from culture filtrates of *S. griseus* prepared as described in Example 6 was dissolved in 10 ml. of water and this solution was divided into two equal parts. Twenty-five ml. of acetone was added to each part and the solutions allowed to stand at about 25–30° C. and after a short time a precipitate formed in each solution. These precipitates, A and B, were separated by centrifuging, washed with acetone and after drying weighed 23.3 mg. and 25 mg. respectively. The mother liquor from each precipitate was diluted with 5 ml. of acetone and again after standing at 25–30° C. for a short time, precipitates C and D formed in each of the solutions. The precipitates C and D were separated by centrifuging and combined; yield 12 mg. The mother liquors from precipitates C and D were combined and diluted with ca. 12 ml. of acetone. This solution after standing for a short time deposited a mixture of amorphous and crystalline precipitate E. The mother liquor of precipitate E was diluted to a total volume of 120 ml. with acetone. This solution after standing for a short time gave a crystalline precipitate F which after separation, washing with acetone and drying weighed 22.4 mg. This compound was fractionally crystallized from water by dilution with acetone. The first two fractions which were collected weighed ca. 6.5 mg. The third fraction was used for comparison with vitamin $B_{12a}$, obtained from vitamin $B_{12}$ by reaction with hydrogen in presence of a catalyst. The refractive indices of the crystalline product dried at ca. 25° C. were $\alpha$, 1.584; $\beta$, 1.640; $\gamma$, 1.657 which after drying at 100° C. two hours in vacuo changed to $\alpha$, 1.608; $\beta$, 1.640; $\gamma$, 1.656.

*Example 8*

Three hundred and fifty milligrams of vitamin $B_{12}$ was dissolved in 75 ml. of water containing 300 mg. of reduced platinum oxide catalyst. This solution was shaken under a slight hydrogen pressure for forty minutes. During the absorption of hydrogen the color of the solution changed from red to brown. On subsequent exposure to air the solution slowly turned red. This solution containing suspended catalyst was diluted with ca. 400 ml. of acetone. After allowing the solution to stand at room temperature for a short time, the dispersed catalyst coagulated and was easily removed by centrifugation. After removal of the catalyst, the solution was diluted to a volume of ca. 900 ml. with acetone. The solution was allowed to stand overnight during which time crystallization took place in the form of dark red needles. The first crop of crystals weighed 200 mg. After one recrystallization from water by dilution with acetone, vitamin $B_{12a}$ of 98 per cent purity by solubility analysis was obtained.

*Anal.*—Found: N, 13.33.

The ultra-violet absorption spectrum in water at natural pH showed maxima at about 2700–2770 A., 3520–3530 A., and 5200–5300 A.

It should be understood that various changes may be made in our process as herein described without affecting the improved results attained. Thus various modifications in conditions as to time, temperature, etc., and various changes in procedure differing from those herein given as illustrative of the preferred embodiments of our invention may be made without departure from the scope thereof. Accordingly, the scope of our invention is to be determined in accordance with the prior art and appended claims.

We claim:

1. In the process for converting vitamin $B_{12}$ to its hydroxy analog wherein the cyanide group of the vitamin $B_{12}$ molecule is replaced by a hydroxy group, herein termed vitamin $B_{12a}$, the step which comprises reacting vitamin $B_{12}$ with hydrogen in the presence of a hydrogenation catalyst.

2. The process for converting vitamin $B_{12}$ into its hydroxy analog, herein termed vitamin $B_{12a}$, that comprises reacting an aqueous solution of vitamin $B_{12}$ having a characteristic red color with hydrogen in the presence of a hydrogenation catalyst, continuing the reaction until hydrogenation is complete as evidenced by a change in color of the solution from red to brown, removing the catalyst, and exposing the solution to oxygen containing gas until the brown color changes back to red.

3. The process as defined in claim 2 wherein the hydrogenation catalyst is a substance selected from the group consisting of platinum oxide, palladium oxide, platinum, palladium, and Raney nickel.

4. The hydroxy analog of vitamin $B_{12}$ wherein the cyanide group of the vitamin $B_{12}$ molecule is replaced by a hydroxy group, herein termed vitamin $B_{12a}$, which is a red substance effective in the treatment of anemias and having growth promoting activity for animals being a weak base substantially free from cyanide groups and forming salts with acids, containing the elements carbon, hydrogen, nitrogen, phosphorus, cobalt and oxygen, further characterized by having ultraviolet absorption maxima at about 270–277 m$\mu$, 352–354 m$\mu$, 520–530 m$\mu$, being soluble in water, lower aliphatic alcohols and aqueous alcohol mixtures, being insoluble in ether, acetone, chloroform, carbon tetrachloride, benzene, and toluene, forming red crystals having indices of refraction of about $\alpha$, 1.580; $\beta$, 1.640; and $\gamma$, 1.656; after drying at 25° C. in vacuo by being convertible into vitamin $B_{12}$ by reaction with solutions containing cyanide ions, and by having an LLD activity of at least 6,600,000 LLD units per milligram.

5. The process for separating the hydroxy analog of vitamin $B_{12}$ wherein the cyanide group of the vitamin $B_{12}$ molecule is replaced by a hydroxy group, herein termed vitamin $B_{12a}$ from a concentrate containing vitamin $B_{12a}$ and vitamin $B_{12}$ obtained from a fermentation broth which comprises extracting an aqueous solution of said concentrate with benzyl alcohol to remove the vitamin $B_{12}$, and recovering vitamin $B_{12a}$ from the resulting aqueous solution.

6. The process for recovering the hydroxy analog of vitamin $B_{12}$ wherein the cyanide group of the vitamin $B_{12}$ molecule is replaced by a hydroxy group, herein termed vitamin $B_{12a}$ from a concentrate containing vitamin $B_{12a}$ and vitamin $B_{12}$ obtained from a streptomycin fermentation broth which comprises extracting an aqueous solution of said concentrate with benzyl alcohol to remove substantially all of the vitamin $B_{12}$, adding acetone to the resulting aqueous solution, and recovering the precipitated crystalline vitamin $B_{12a}$.

7. The process for recovering the hydroxy analog of vitamin $B_{12}$ wherein the cyanide group of the vitamin $B_{12}$ molecule is replaced by a hydroxy group, herein termed vitamin $B_{12a}$ from a concentrate containing vitamin $B_{12a}$ and vitamin $B_{12}$ which comprises, adding acetone to an aqueous solution of said concentrate causing a crystalline precipitate to form, separating said precipitate, adding additional acetone to the mother liquors from said precipitate causing the precipitation of a second crystalline product, and repeating said fractional crystallization procedure to recover a crystalline fraction consisting of substantially pure vitamin $B_{12a}$.

8. The hydroxy analog of vitamin $B_{12}$ wherein the cyanide group of the vitamin $B_{12}$ molecule is replaced by a hydroxy group which is a red crystalline substance effective in the treatment of anemias substantially free from cyanide groups containing the elements carbon, hydrogen, nitrogen, phosphorus, cobalt and oxygen, further characterized by having ultraviolet absorption maxima at about 273 m$\mu$, 351 m$\mu$, 525 m$\mu$, being soluble in water, methanol and ethanol, being insoluble in ether, acetone, chloroform and toluene, being convertible into vitamin $B_{12}$ by reaction with solutions containing cyanide ions, and by having an LLD activity of at least 6,600,000 units per milligram.

(References on following page)

References Cited in the file of this patent

UNITED STATES PATENTS

| | | |
|---|---|---|
| 1,872,775 | Major | Aug. 23, 1932 |
| 2,563,794 | Rickes | Aug. 7, 1951 |

OTHER REFERENCES

Dounce: Science, vol. 97, Jan. 1, 1943, pp. 21, 22, 23.
Science, vol. 107, Apr. 16, 1948, pp. 396, 397, 398.
Girdwood: Lancet, Aug. 20, 1949, p. 346.
Kaczka: Jour. of the Amer. Chemical Society, vol. 71, Apr. 1949, pp. 1514, 1515.
Smith: Nature, Apr. 24, 1948, vol. 161, pp. 638, 639.
Smith: Proceedings of the Biochemical Society in the Biochemical Journal, vol. 43, No. 1, Oct. 1948, pp. VIII, IX.
Rickes: Science, Dec. 3, 1948, pp. 634, 635.
Spies: Southern Med. Jour., Jan. 1950, p. 50.
Zucker: Vitamins and Hormones, vol. 8, (1950) p. 7.